Sept. 30, 1969   R. S. HAGAN ET AL   3,470,277
PROCESS OF MAKING CELLULAR PLASTIC PRODUCTS
Filed Aug. 24, 1966
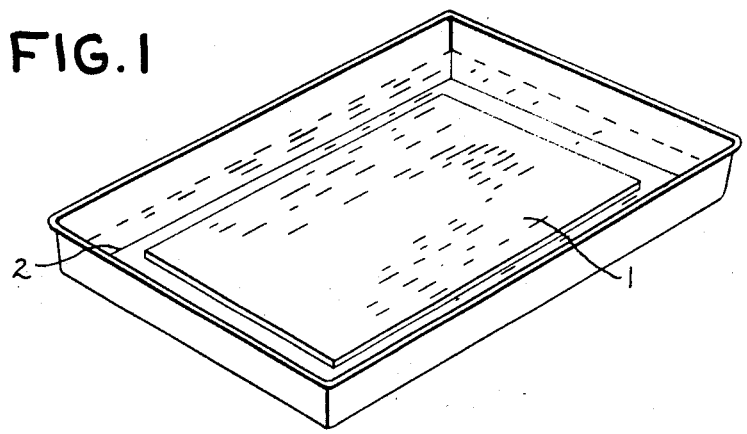
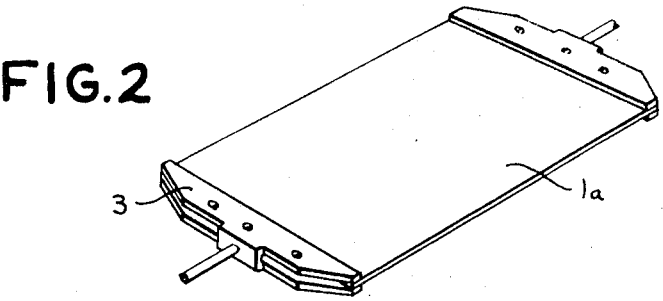
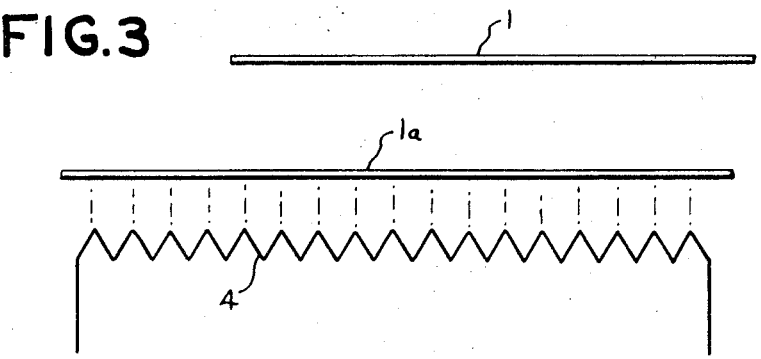
INVENTORS
RALPH S. HAGAN
& FRANCIS J. HARTLAGE
BY
THEIR ATTORNEY

United States Patent Office
3,470,277
Patented Sept. 30, 1969

3,470,277
PROCESS OF MAKING CELLULAR PLASTIC PRODUCTS
Ralph S. Hagan and Francis J. Hartlage, Louisville, Ky., assignors to General Electric Company, a corporation of New York
Filed Aug. 24, 1966, Ser. No. 574,537
Int. Cl. B29d 27/00; B29h 7/20
U.S. Cl. 264—53
6 Claims

ABSTRACT OF THE DISCLOSURE

A cellular plastic product of relatively small cell size is produced by mechanically straining a sheet of plastic material saturated with a vaporizable blowing agent before heating the saturated sheet to vaporize the blowing agent.

---

The present invention relates to the production of cellular plastic products and is particularly concerned with the production of cellular or foamed thermoplastic products characterized by a uniform, relatively small cell size.

A well known process for the production of cellular thermoplastic products involves contacting a solid thermoplastic resin with a blowing agent having limited solubility in the thermoplastic resin and adapted upon the subsequent vaporization thereof to expand the resin and form a cellular product.

Examples of foamable thermoplastic resins are the polymers and interpolymers of polymerizable monomers containing the vinylidene group $CH_2=C=$, such as vinyl chloride, vinyl bromide, vinylidene chloride, ethylene, isobutylene, propylene, vinylacetate, vinyl methyl ether, acrylic acid, methyl methacrylate, acrylonitrile, styrene, alpha-methyl styrene, vinyl toluene and various interpolymers of such monomers with alpha, beta unsaturated polycarboxylic acids and their derivatives; e.g., maleic anhydride, diethyl maleate, diallyl maleate, etc.

Suitable organic foaming or blowing agents for expanding such resins are well known in the art and the selection of a particular agent is dictated largely by the particular resin in which it is to be incorporated. Examples of such blowing agents are pentane, hexane, heptane and saturated aliphatic chlorofluorohydrocarbons such as trichlorofluoromethane, dichlorodifluoromethane, hexachlorodifluoroethane, etc.

In accordance with one process of preparing cellular products, the solid thermoplastic resin is immersed in or otherwise contacted with the blowing agent until a desired amount of blowing agent has been absorbed or dissolved in the solid resin. Subsequent vaporization of the blowing agent, usually accomplished at elevated temperatures, causes the resin to expand or foam. The average cell size of the resultant product depends upon a number of factors. It may be controlled by the conditions under which the foaming takes place. For example, when foaming under pressure as in a mold, the average size of the cells will tend to be smaller. Also, it is possible to add various nucleating materials which promote the formation of a relatively large number of smaller cells.

The present invention has as its primary object an improvement on the above process designed primarily to provide the production of products having uniformly smaller cells.

Further objects and advantages of the invention will become apparent as the following description proceeds and the features of novelty which characterize the invention will be pointed out with particularity in the claims annexed to and forming part of this specification.

In accordance with the present invention, a cellular product is prepared by contacting a sheet of thermoplastic material with a blowing agent and prior to the expansion thereof by vaporization of the blowing agent, subjecting the material to straining or elongation forces sufficient to substantially strain the impregnated sheet material. This straining of the material, which presumably results in an orientation of the resin structure, has been found to result in a foam structure having a substantially more uniform and smaller cell structure.

The resultant foamed products substantially retain the surface finish of the original sheet material and are particularly useful for various applications where foamed parts having good strength and appearance are desired. Further, because of the smaller cell structure, the products may also be employed for insulating purposes.

The accompanying drawing diagrammatically illustrates the operational steps of the present invention.

FIGURE 1 is a perspective view illustrating an initial step;
FIGURE 2 is a perspective view illustrating a subsequent step of the process;
FIGURE 3 is a view illustrating for comparison purposes the initial length of a sheet of plastic material; and
FIGURE 4 illustrates final step in the process of the present invention.

With reference to the drawing, a sheet of plastic material 1 is immersed in a blowing agent 2 as illustrated in FIGURE 1 to saturate the sheet with the blowing agent. Using suitable means 3, the saturated sheet indicated by the numeral 1a in FIGURE 2 is then subjected to mechanical straining to produce an elongation thereof. The straining is sufficient, for example, to elongate the sheet 1 of an initial length such as illustrated in FIGURE 3 to the length illustrated in FIGURE 4. The elongated sheet 1a is then warmed as by means of a heater 4 to vaporize the blowing agent.

The following examples will illustrate the invention in greater detail.

Example I

Sheets of polypropylene were immersed in trichloromonofluoromethane at 68° until they were substantially saturated. The sheets swelled only slightly but absorbed or dissolved about 27 percent by weight of the blowing agent based on the weight of the original sheets. One of the sheets was immediately placed in a 300° F. oven for nine minutes while the remaining sheets were stretched to different degrees before being placed in the oven for the same number of minutes. The elongations and the average cell sizes of the expanded products are set forth in the following table:

TABLE I

| Imposed strain percent elongation: | Average cell size, mm. |
|---|---|
| 0 | 1.07 |
| 50 | 0.18 |
| 150 | 0.05 |

The mechanical straining did not materially affect the total expansion of the various sheets. All of them expanded to a density of 9 to 12 pounds per cubic foot as compared to a density of 58 pounds per cubic foot for the polypropylene sheet material.

Example II

Shets of an acrylonitrile-butadiene-styrene copolymer sold under the trademark Cycolac L, were immersed in trichloromonofluoromethane for fifty hours at 68° F. to assure saturation thereof with a resultant weight increase of about forty percent. The saturated sheets were more flexible but exhibited very little swelling. The effect of various imposed strains prior to the foaming of the resultant products in a 300° F. oven for five minutes are shown in Table II:

TABLE II

Imposed strain
percent elongation:     Average cell size, mm.
0 ---------------------------------- 5
20 ---------------------------------- 2.8
50 ---------------------------------- 0.79
150 ---------------------------------- 0.20

From the above examples it will be seen that mechanical straining or elongation materially affects the cell size or average cell size of the foamed or cellular resin. An elongation of about twenty percent decreases the average cell size by about fifty percent. It is believed that the straining serves to nucleate the formation of a large number of small cells and thereby prevent the formation of a smaller number of larger cells.

The results also indicate that for a material improvement in the average cell size of the foamed products an elongation of at least twenty percent is desirable, that is an elongation of the material by at least twenty percent prior to the heat treatment.

All of the above samples were free-foamed, that is, foamed at atmospheric pressures. In addition to having uniform, regular and relatively small cells, all of the foamed, strained sheets also exhibited hard, smooth skin structures which closely resembled the skin structures of the original sheets prior to immersion thereof in the blowing agent. On the other hand, all of foamed, unstrained sheets had irregular non-uniform surfaces characterized by a number of blisters.

While the invention has been described with reference to specific embodiments thereof, it will be understood that various changes and modifications may be made without departing substantially from its intended spirit and scope.

What we claim as new and desire to secure by Letters Patent of the United States is:

1. In the process of making a cellular plastic product by saturating a solid sheet of a thermoplastic resin with a vaporizable blowing agent and vaporizing the blowing agent in the saturated sheet to produce a cellular product; the improvement which comprises mechanically straining said saturated sheet to produce an elongation thereof at least twenty percent prior to the heating thereof whereby there is produced a foamed product characterized by a substantial decrease in the average cell size.

2. The process of claim 1 in which said blowing agent comprises a chlorofluorohydrocarbon.

3. The process of claim 1 in which said resin is polypropylene.

4. The process of claim 1 in which said resin is an acrylonitrile-butadiene-styrene copolymer.

5. The process of claim 3 in which said resin is saturated with trichloromonofluoromethane as the blowing agent.

6. The process of claim 4 in which said resin is saturated with trichloromonofluoromethane as the blowing agent.

References Cited

UNITED STATES PATENTS

| | | | |
|---|---|---|---|
| 2,409,910 | 10/1946 | Stober | 264—45 |
| 2,442,940 | 6/1948 | Staudinger et al. | 264—53 |
| 2,681,321 | 6/1954 | Stastny et al. | 264—53 XR |
| 3,262,625 | 7/1966 | Russell et al. | 264—53 XR |
| 3,324,211 | 6/1967 | Maurer et al. | 264—53 XR |
| 3,389,199 | 6/1968 | Bushnell et al. | 264—53 |

PHILIP E. ANDERSON, Primary Examiner

U.S. Cl. X.R.

161—402; 260—2.5; 264—288